(12) United States Patent
Burg et al.

(10) Patent No.: US 6,512,922 B1
(45) Date of Patent: Jan. 28, 2003

(54) INFORMATION SERVICES PROVISION IN A TELECOMMUNICATIONS NETWORK

(75) Inventors: Bernard Burg, Paris (FR); Ronnie Taib, Marseille (FR); Alan Schmitt, St. Leu D'Esserent (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/489,641

(22) Filed: Jan. 25, 2000

(30) Foreign Application Priority Data

Jul. 13, 1999 (EP) ............................................. 99401758

(51) Int. Cl.$^7$ ................................................. H04Q 7/20
(52) U.S. Cl. ........................ 455/432; 455/435; 455/517; 455/462; 370/331; 370/338
(58) Field of Search ................................. 455/432, 435, 455/517, 462, 465; 370/331, 338

(56) References Cited

U.S. PATENT DOCUMENTS

| | | | | |
|---|---|---|---|---|
| 5,802,465 A | * | 9/1998 | Hamalainen et al. | ........ 455/403 |
| 5,825,759 A | | 10/1998 | Liu | ............................. 370/331 |
| 5,956,331 A | * | 9/1999 | Rautiola et al. | ............ 370/338 |
| 6,122,268 A | * | 9/2000 | Okanoue et al. | ............ 370/338 |
| 6,167,122 A | * | 12/2000 | Titmuss et al. | .......... 379/93.15 |

FOREIGN PATENT DOCUMENTS

| | | | |
|---|---|---|---|
| WO | WO 93 01665 A | 1/1993 | ............ H04Q/7/22 |
| WO | WO 98 47295 A | 10/1998 | ............ H04Q/3/00 |

* cited by examiner

*Primary Examiner*—William Trost
*Assistant Examiner*—Eugene Yun
(74) *Attorney, Agent, or Firm*—Kenneth A. Haas

(57) ABSTRACT

A radio telecommunications network for providing information services to a mobile subscriber (22) includes a distributed arrangement of Agent Transceiver Systems (13, 14, 15), each associated with a base station (17, 18, 19) serving a respective geographical area, and each acting as a host platform for local information services. This distributed arrangement keeps the transmission loads due to accessed information which is added to the radio communications system to a minimum. A further feature of the invention allows mobility of a subscriber's personalised details to be moved around from platform to platform as he moves from one location to another, without interfering with the usual operation of the telecommunications system. Links (20, 21, 23) to a global services platform also provide access to Internet-type services.

14 Claims, 6 Drawing Sheets

INFORMATION SERVICES PROVISION IN A TELECOMMUNICATIONS NETWORK

Figure 1:
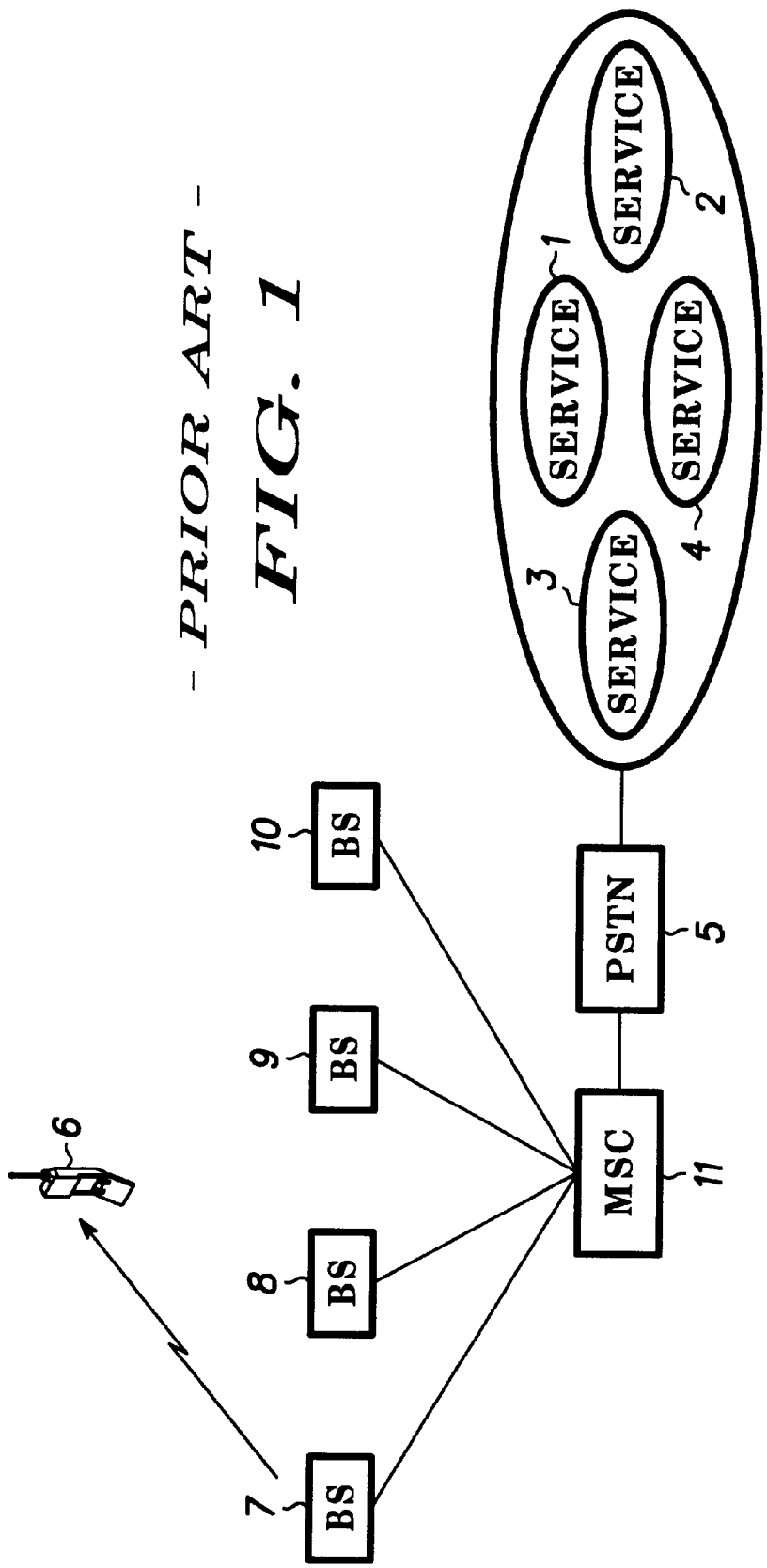

This invention relates to the provision of information services, such as Internet services for example, which can be accessed by a subscriber via a mobile subscriber terminal, such as a mobile 'phone.

The invention has particular application to the provision of such services utilising the infrastructure of a cellular radio telecommunications network such as that provided currently by GSM (Global System for Mobile Communications) or by future third generation systems known as UMTS (Universal Mobile Telecommunications System).

The invention exploits "Agent" technology by which means, software code can be moved from one host platform to another.

Applicants co-pending Application EP 99 400 773.0 describes a method for accessing an information service in a telecommunications network. The method includes the steps of detecting at a subscriber terminal a request input for an information service; comparing a parameter of the request input with a stored value; selecting an action list depending upon the comparison and transmitting a demand for execution of the action list to the network. The network responds by executing the action list and transmitting the requested information back to the subscriber terminal. Communication between the terminal and the network is performed by means of "Agents" which are pieces of mobile software code.

Applicant's co-pending Application EP 98 400 960.5 discloses a method of handling data in a system comprising a subscriber terminal and a communications network. This method provides a host platform for receiving an Agent associated with the terminal permitting, at the host platform, communication between the Agent and at least one other Agent.

The purpose of an Agent is to transfer and receive information and to execute tasks. The Agent representing the subscriber terminal can be, for example, a Java™ applet.

Pieces of software code can be encapsulated by or embedded in an Agent and can be specific to a subscriber terminal. It is thus possible to execute any kind of user-defined function on data gathered by the subscriber-associated Agent or provide services offered by existing service providers, for example, stock exchange fluctuation updates or bank account monitoring.

A host platform can be thought of as an Agent Meeting Place (AMP) and in the above reference this is located at a base station comprising a radio telecommunications system.

Each Agent Meeting Place comprises an Agent System which can create, interpret, execute and transfer Agents. Examples of suitable Agent systems are those defined by the Foundation for Intelligent Physical Agents (FIPA) and the Mobile Agent Facility Specification of the Object Management Group (MAFOMG). Agent systems provide security functions, for example authentication and information confidentiality functions, such as, data encryption.

An Agent Meeting Place (AMP) typically comprises, for example, a Yellow Pages service, a White Pages service, a unique naming service, a management system that controls the life-cycle and mobility of the Agent associated with a subscriber terminal and a transparent communications service. They can also provide a database facility to store data intended to stay on the AMP platform permanently. Communications between the Yellow Pages service, the White Pages service, the management system, the transparent communications service, or the database facility can be achieved by providing a respective Agent for each of the services or facility. Alternatively, the Yellow Pages service, the White Pages service, the management system, the transparent communications service, or the database facility can be a dedicated Agent containing the data stored by the Yellow Pages service, the White Pages service, the management system, the transparent communications service, or the database facility, respectively. The Yellow Pages service is a service provided to any Agent, by the AMP for looking-up services provided by other Agents residing locally at the respective AMP. The Yellow Pages service can optionally search all Agent systems forming an Agent community. The White Pages service is a service which covers all Agents which are currently resident on the AMP where the White Pages service is located, i.e. locally, for determining the existence of another Agent locally.

The address of an AMP can be, for example, a 'phone number or a TCP/IP address and can be known by means of the Yellow Pages service. A default AMP address is assigned to each Agent in order to ensure an initial inter-Agent communications can be set up. AMPs can communicate with other AMPs or other Agent systems to exchange messages or Agents via the transparent communications service.

An Agent associated with a subscriber terminal can register and de-register with an AMP in the following, known manner.

The Agent associated with a subscriber terminal calls a toll-free number, and establishes a radio link between the terminal and the AMP.

The terminal's Agent resides in a memory of the terminal on an aglet platform. The Agent is translated through Java on the terminal and then serialised through the underlying Java layers. The Agent is then transmitted to the AMP The Agent is sent, using a TCP/IP protocol known in the art, in packets, using a General Packet Radio Service (GPRS).

Once received, the Agent is then deserialised, translated back through the underlying Java at the AMP and then reverts to aglet form, Access to the AMP is thereby achieved.

The Agent then registers with the AMP, in order to register to the Yellow Pages service, the White Pages service and the Agent management system of the AMP. The registration procedure uses the security functions defined by the service provider, i.e. authentication and information security. Consequently, the terminal's Agent becomes known and accessible to any other Agents present at the AMP.

During the registration procedure, the terminal's Agent can also provide information, for example, current information about the terminal represented by its Agent. The current information about the terminal can include the services capabilities of the terminal, for example, third party calling or conference calling, the radio link quality, bit rate, or maximum bit error rate. The current information can be stored in a database facility of the AMP by a database Agent.

The terminal's Agent can then execute an assigned task or mission. The assigned task or mission can be a dialogue between the Agent and any other Agent residing at the AMP and/or a referral to the database facility of the AMP. The communication protocol between Agents is provided by the AMP, as specified by FIPA Agent Communication Language (ACL). The assigned task can also be the execution of Agent code on the AMP, for example, the performance of functions, such as on data. The execution of Agent code therefore allows functions to be carried out so as to manipulate the information or data gathered at the AMP.

If necessary, information is sent back to the terminal. At any time whilst its Agent resides at the AMP, the Agent can send messages to the terminal. This information is sent back via a Short Messaging Service (SMS). Also, at any time whilst the Agent resides at the AMP, a message can be sent to the Agent from the terminal in order to update it. This can be achieved via the toll-free number or by using the TCP/IP protocol as described above. The structure of the message is defined by various standards bodies, for example, FIPA or MAF-OMG, or by proprietary technology such as Agents. The information to update the Agent can be routed to the agent by means of addressing techniques known in the art, since the Agent and any other Agents resident at the AMP possess specific ID numbers associated with the Agents assigned by the unique naming service as described above.

The terminal's Agent can de-register from the AMP. De-registration from the AMP removes all the references to the first Agent from the unique naming service, the Yellow Pages service, and the White Pages service. However, the references to the Agent in the database facility of the AMP can be retained. The Agent is then either killed or can migrate to another AMP or back to the terminal.

One aim of the present invention is to provide high value added services to match virtual and real worlds, through a decentralised approach integrated to a radio telecommunications network. Each user has a representative piece of mobile code i.e. An Agent that follows him in the service world as he moves. This opens up a new range of possibilities e.g. customisation of services at their source and new possibilities of service access.

As an example, when entering a shopping mall, it would be convenient to have a service for guiding the customer directly to those shops which have the goods he intends to buy, instead of him having to enter several shops before finding the article required.

Known technologies use a centralised access which links the radio telecommunications network to the world of services like the Internet. Such technologies are illustrated in the schematic block diagram of FIG. 1. FIG. 1 shows a conglomeration of services 1 to 4 (e.g. Internet services) connected to a public switched telephone network (PSTN) 5. These services 1 to 4 are accessible to the user of a mobile 'phone 6 by means of a radio link to one of several base stations (BS) 7 to 10 which in turn, are connected to a mobile switching centre (MSC) 11. The base stations and the MSC comprise a radio telecommunications network with the MSC 11 being hard-wire connected to the PSTN 5.

Providing services with this known technology generates an additional burden of messages between base stations and the MSC and forms a bottle neck because the messages have to be transmitted through the PSTN to the services. The volume of messages generated by such services is very high for the following reasons. Firstly, all terminals 6 (including those in idle mode) can access services, and secondly, services communicate via messages in which they embed their data such as files, images, sounds, etc.

This known technology handles these service-related messages in the same manner as voice and data messages of the radio telecommunications network. Thus, such use of services can cause a reduction in the quality of service provided by the network. Furthermore, the MSC-PSTN interworking function needs to be adapted to cope with this message flow.

The present invention seeks to mitigate the above disadvantages.

Accordingly, the present invention consists of a radio telecommunications system for facilitating access of information services by a subscriber terminal, the system including a plurality of base stations serving a respective geographical area and for establishing a radio communications link with the subscriber terminal, and characterised by a plurality of information host platforms, one of each thereof being associated with a respective base station in which each information host platform incorporates information services local to said respective geographical area.

The subscriber terminal may comprise a mobile telephone. The mobile telephone may be connected to a computer terminal thereby allowing a user to down-load accessed information.

The present invention overcomes the difficulties mentioned above by allowing local access to the services. For example, in a GSM network, this access could be local to the cell coverage area of a particular base station. The host platform is equivalent to the Agent Meeting Place (AMP) as discussed above and will be referred to hereafter as an Agent Transceiver System (ATS). Each ATS is therefore associated with a geographical area. However, it does not need to be physically located in the area it is associated with.

An ATS hosts or accesses any service in the "cyberspace" and provides a meeting place for Agents linked to users, services or information. Being logical, several Agent Transceiver Systems can be hosted by the same machine. An ATS network links the individual Agent Transceiver System and allows transmission of data and code between the Agents Transceiver Systems.

The invention relies on the radio communications network only for communication facilities between the base stations and the subscriber terminals. As a consequence, local services communicate directly and locally with the users, keeping the added load to the radio communications network to a minimum.

In general, three families of methods can be identified by the present invention; management of users, management of services and management of meetings.

Managing users; An ATS hosts User Representative Agents (URA). This kind of representative follows the terminal, filters its messages and manages the services for the terminal. The URA allows control of the volume of information exchanged between a base station and the terminal and allows optimisation of the use of radio frequency links.

The protocol describing how the URA follows the terminal around in the service world forms another aspect of the invention and is described below.

The URA associated with a particular terminal may comprise personalised data such as special dietary requirements or mobility requirements of the user which would be useful when selecting restaurants or hotels in the user's local or geographical area. Agent mobility (either code or data mobility) is handled by the ATS network and does not generate messages in the mobile telecommunications network except in the radio frequency link between the base station and the terminal and only when the terminal is sending or receiving services. Agents can move from a terminal to the ATS and also move to service arenas like the Internet or to any Agent Meeting Place and vice versa.

Managing services; Services are represented on the ATS by Service Representative Agents (SRA). Agents publicise their skills via Yellow Pages by describing the function they provide. The Yellow Pages are local to the ATS and may be accessed by other SRA's and URA's. Remote services like Internet based services or centralised services may be accessed in one of two ways. I.e. either by searching for appropriate SRA's at the ATS, or by using search mechanisms such as Yellow Pages, Internet search engines, etc.

Managing meetings; Each ATS possesses White Pages where the names of the local Agents are stored in order to facilitate communications. Agent Transceiver Systems are meeting places for numerous URA's, SRA's, thus every interaction as possible, e.g. users to users, services to services, services to users, users to services. These interactions do not have to be restricted to two parties. Of course, the services and users also have access to information in the ATS. The ATS is in charge of security checks, by entrusting rights to Agents to access data, services and to use ATS resources such as memory and processing power. As the ATS manages security, it is best suited to handling billing of services. This billing may be connected to the billing of the radio telecommunications network.

Some of the benefits of the present invention are as follows. As each ATS is a logical entity, the network deployment can start from a single centralised ATS and be extended gradually and transparently according to the demand of services. The ATS may be owned and controlled by telecommunications operators or by service providers. Users can own and control their own data. This data may either be stored inside the terminal or in the URA. The data may be used by the URA according to a policy chosen by the user. The URA's are representative of the user on ATS, thus they permit customisation of services. In addition to the usual filter capabilities, the URA permits browsing for new services and for learning user habits. A URA optimises the use of available radio frequency bandwidth by defining the interests, preferences and needs of the user at the service layer. Thus, unwanted message or services (such as advertising) can be discarded by the URA and will never be transmitted over the radio frequency link.

Providing a service simply requires advertising it in Yellow Pages, or sending a SRA to the ATS, thereby providing direct access to the user. An ATS is an open platform capable of offering Internet-like service development. The invention creates new business opportunities in the field of electronic commerce and services in general. The invention gives a network operator control of this environment and the control of the information exchange between the radio telecommunications network and the service area. This is a keystone for mobile access to local services.

Figure 2:
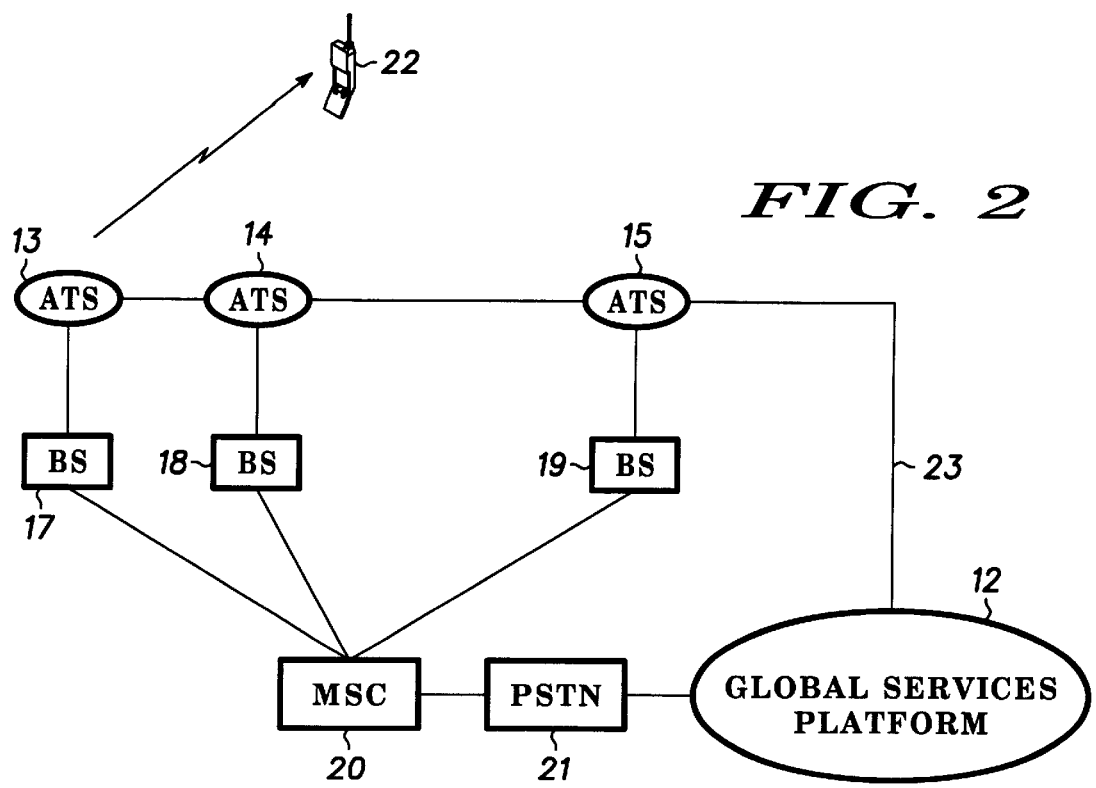
Figure 3:
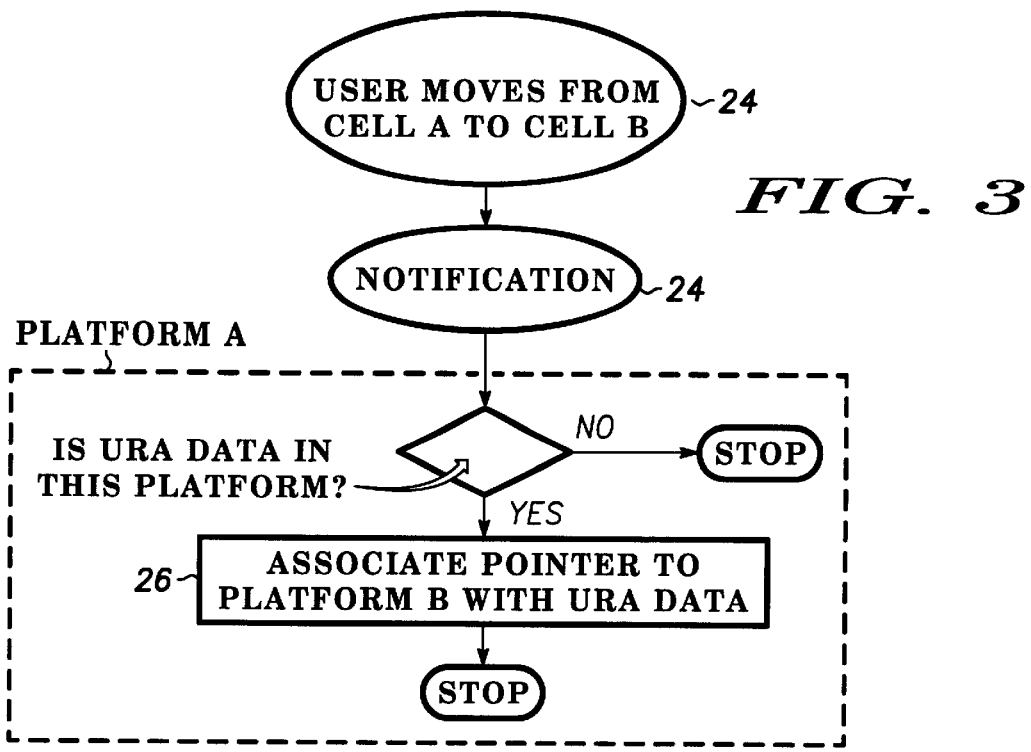
Figure 4:
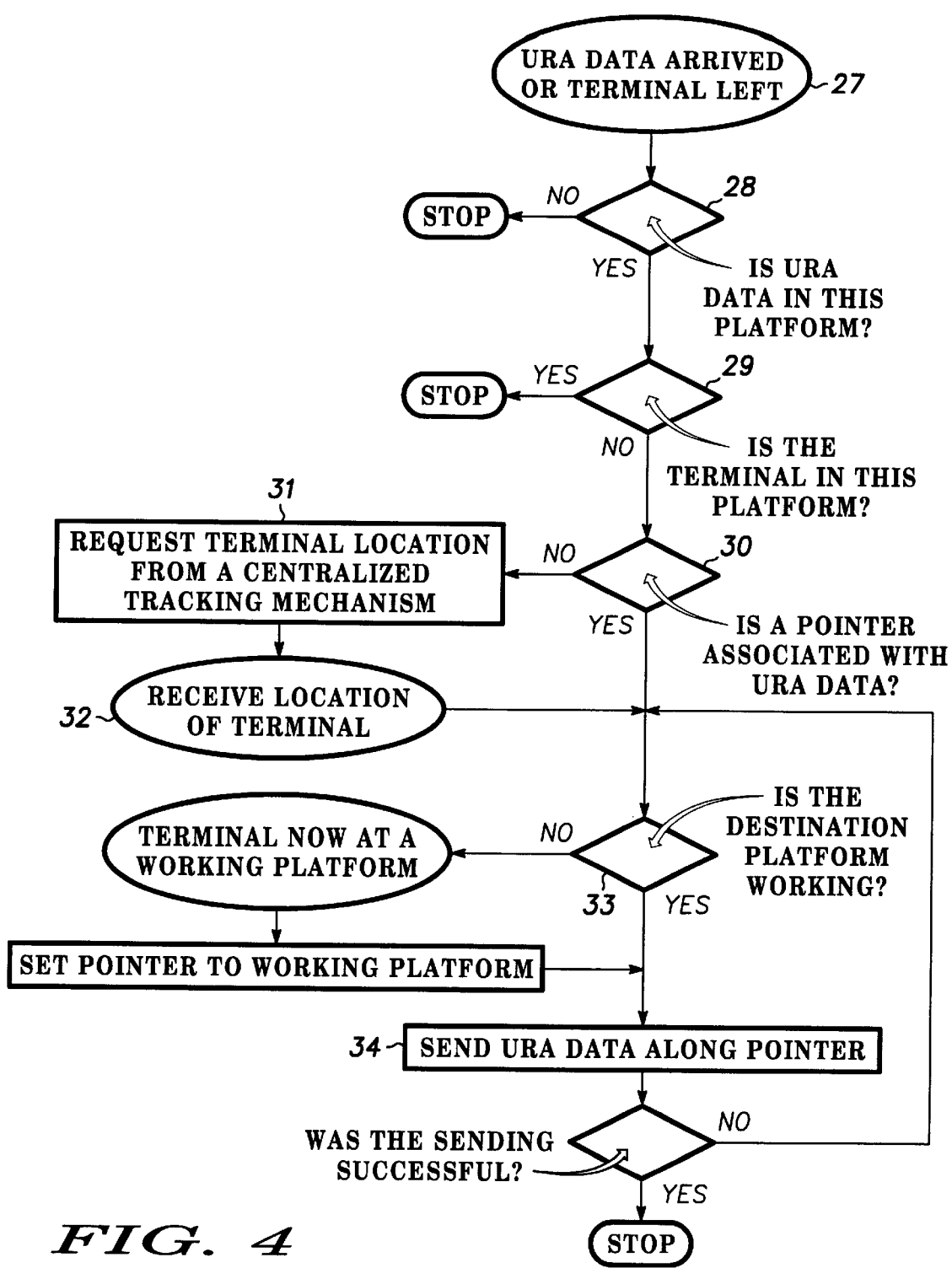
Figure 5:
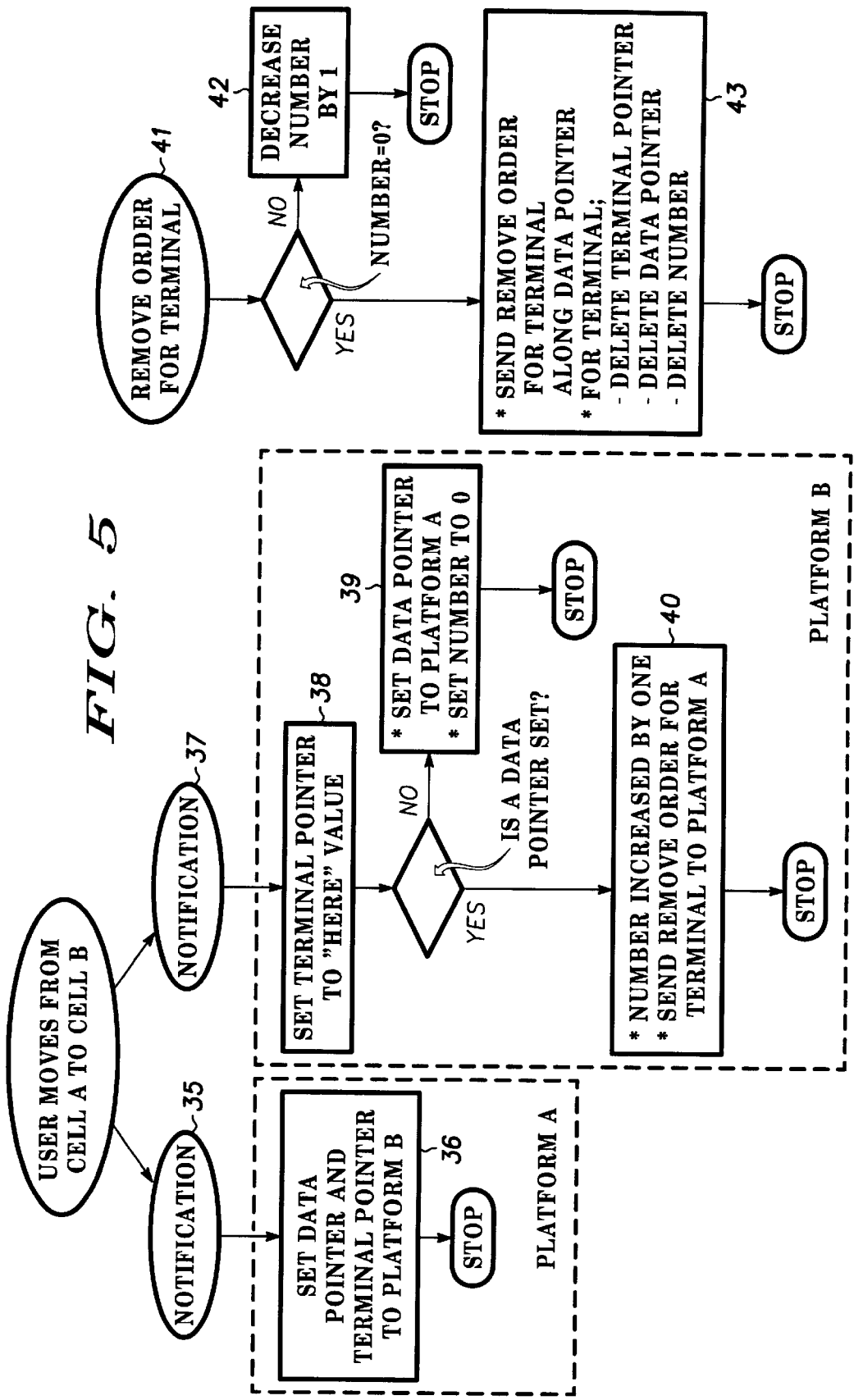
Figure 6:
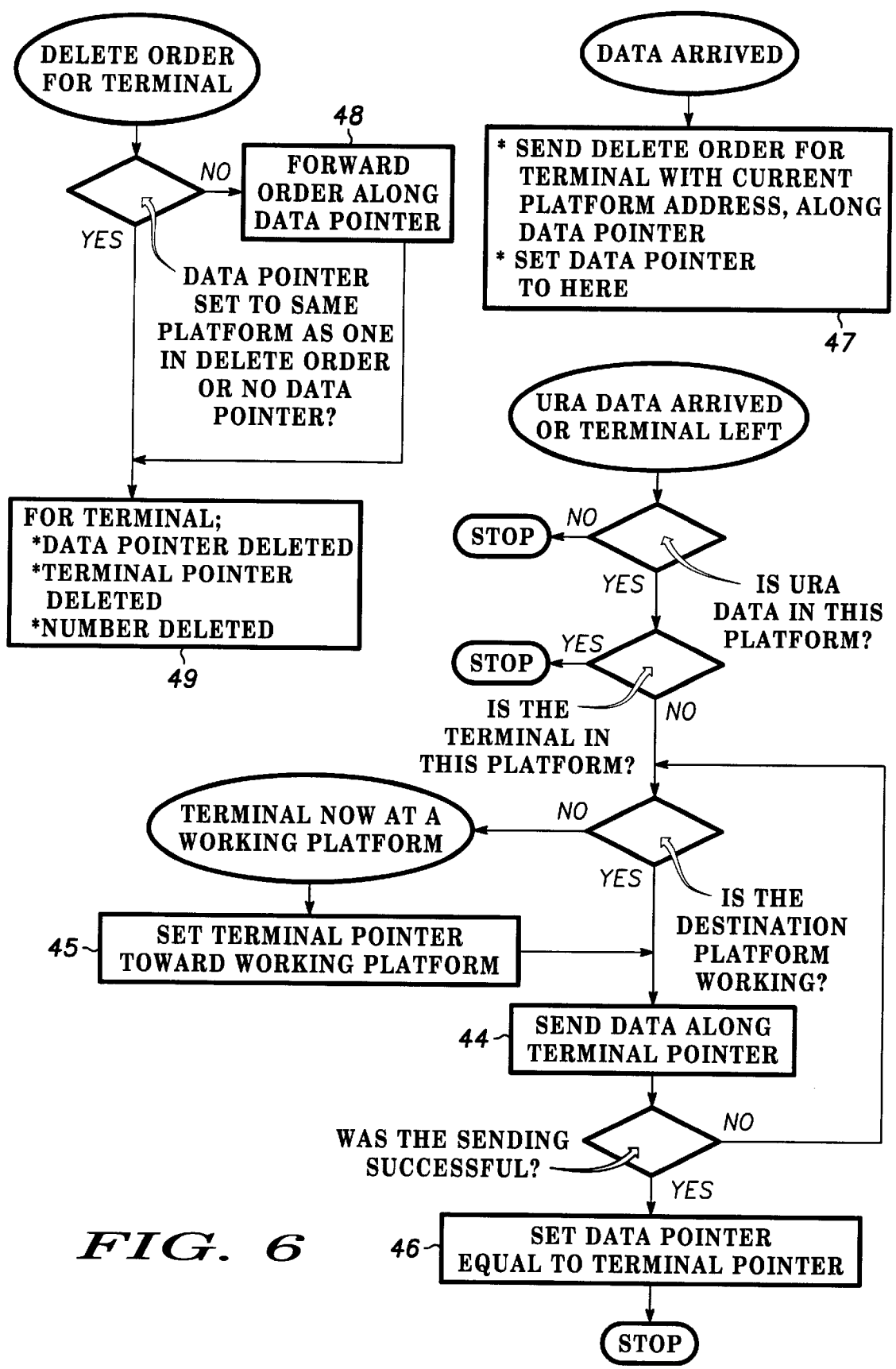
Figure 7:
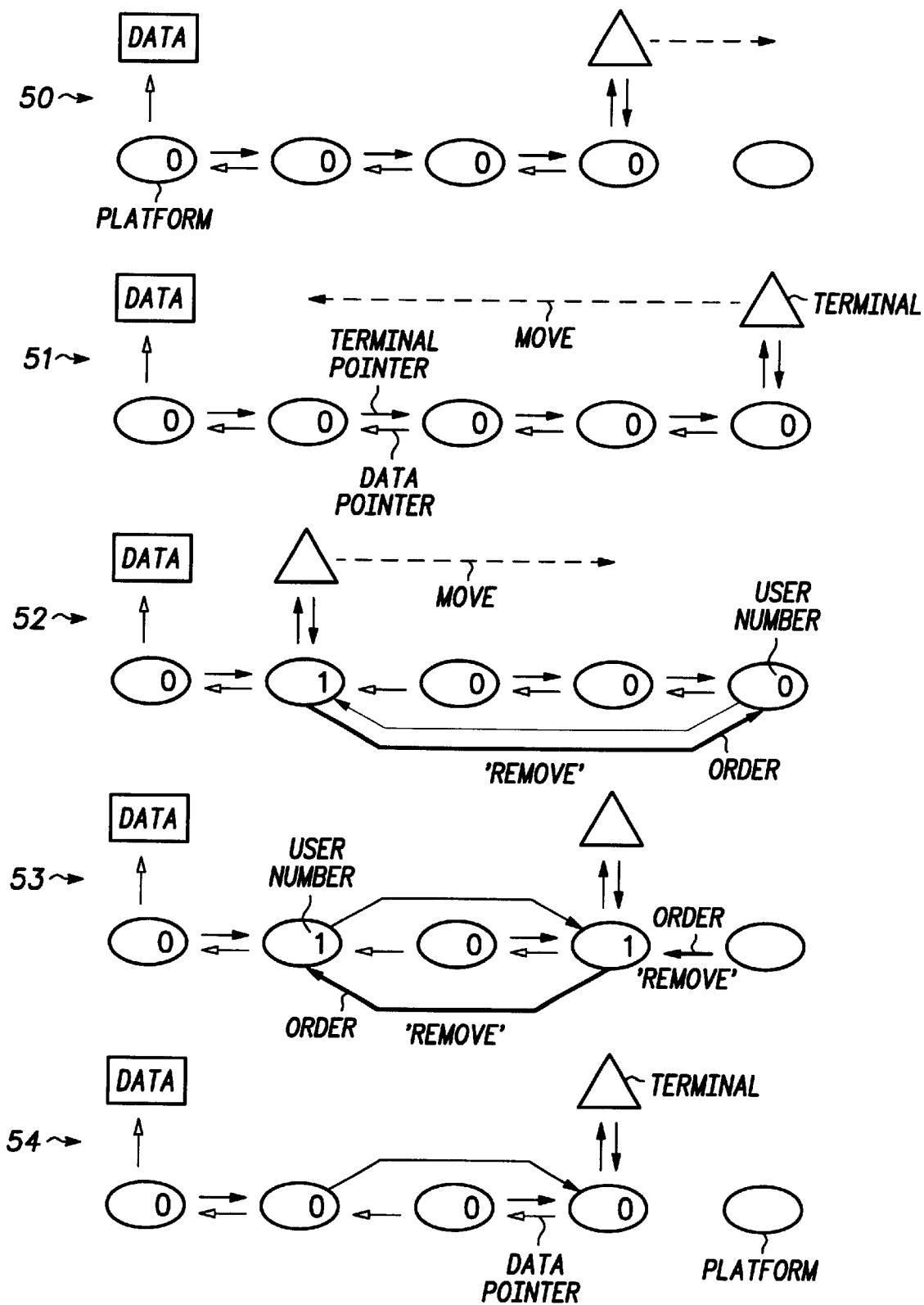

Some embodiments of the invention will now be described by way of example only, with reference to the drawings of which;

FIG. 1 is a schematic block diagram of a known radio telecommunications system having access to a central information service, FIG. 2 is a schematic block diagram of a radio telecommunications system incorporating a distributed information service in accordance with the invention, FIGS. 3 and 4 are flow diagrams illustrating a first protocol in accordance with the invention, and FIGS. 5, 6 and 7 are flow diagrams illustrating a second protocol in accordance with the invention.

In FIG. 2, information services are provided by global services platform 12 and by a plurality of Agent Transceiver Systems (ATS), three of which are represented in 13, 14 and 15. Each ATS serves a designated geographical area and each is incorporated in respective base stations 17, 18 and 19. Local services register with their local ATS by means of SRA's.

The base stations 17, 18 and 19 form part of a mobile radio telecommunications system which also includes a mobile switching centre (MSC) 20. The MSC 20 is linked to a PSTN 21. The PSTN 21 is linked to the Global Services Platform 12.

Each ATS 13, 14, 15 is linked to its neighbours and to the Global Services 12 by a network 23.

A user equipped with a mobile terminal 22 is able to access any service provided by the ATS which is associated with this serving base station. He can also access the Global Services Platform 12 via the radio telecommunications network and the PSTN network and other local services by means of network 23. The terminal 22 contains a URA relating to the customer's profile and can be registered at an ATS 13, 14, 15 via a radio link to the appropriate serving base station 17, 18 or 19 in the known manner previously described.

Thus, by means of the interaction between User Representative Agents and Service Representative Agents at the Agent Transceiver Systems (which serve as Agent Meeting Places), information services can be accessed by and transmitted to the mobile terminal over the radio link established by its serving base station.

The embodiment of FIG. 2 allows the terminal 22 to access local services provided by the ATS 13, 14, 15 and to access the Global Services Platform 12 via the PSTN 21, thereby guiding a customer by providing him with context-sensitive and time-relevant information and providing services anytime, anywhere and in particular whilst traveling.

Some examples of the types of services available to the terminal 22 as it moves from region to region served by the base stations 17, 18, 19 are as follows.

When the customer arrives at a given location, he gets access to the service. This access is valid as long as he stays in the geographic area and is curtailed when he leaves it. As an example of this, a supermarket may put an advertisement in a stationary local temporary service. As soon as a customer approaches the supermarket, he gets information about bargains, special offers, the directions to the car park, etc. The ATS is linked to a shopping mall and may be either owned by a telecommunications operator or some other private company. This information is only accessible when entering the geographic area of the supermarket.

In a second case, when the customer arrives at a given location, he gets access to a service. This access remains valid even after leaving the geographic area. For example, a theatre may want a permanent connection with its customers. The first time a customer goes to the theatre he gets access to a stationary local permanent service. The ATS is linked to a picocell (not shown) and owned by the theatre. Later, and independently of their location, he gets access to newsletters, programmes, etc. from the theatre by means of the network 23.

In a third case, a global service can be accessed from any location. When the customer arrives at a location, the global service is triggered and appears on the visual display of the terminal 22. This access is valid until he leaves the geographic area. As an example, a customer could ask for the delivery of music that could be relayed to suitable audio equipment but which would cease when the customer left the local area.

In a fourth case, a global service can be accessed from any location and is permanent. Examples are the weather forecast and the Stock Exchange reports.

In a fifth case a local follower service trails the user. It provides the same service everywhere but uses local data. An example is a meeting service. This service is always looking for friends on the current ATS. Once friends are detected, a message is sent to all of them to propose a meeting place and time.

In a sixth case, a roaming service has high mobility and can explore networks such as the Internet, via the network 23, to execute methods and tasks on behalf of the user. It can collect results which can be sent back to the customer. As an example, a personal traveling service can plan a voyage, make local arrangements such as hotel reservations and finally propose a complete tour package to the customer.

Providing a distributed set of host platforms as is provided by the Agent Transceiver Systems 13, 14, 15 gives a major advantage to telecommunications operators. It opens up a new field of opportunities for hosting local services as well as providing existing remote services.

Mechanisms for moving a customer's User Representative Agent (URA) around the service world wherever he goes, will now be described with reference to FIGS. 2 to 7.

This aspect of the invention allows the URA for an individual customer to reside at any ATS associated with the base station which is currently serving the customer, thereby allowing him instant access to his local services and without the need for him to re-register with a new ATS as he moves from one location to another.

It is preferable to ensure that the code or data that follows a terminal by moving through host platforms does not interfere with the normal operation of the mobile telecommunications service.

This aspect of the present invention provides an asynchronous mechanism for moving a URA, thereby following the terminal as it "hands-over" from one "cell" served by a base station to a second cell served by an adjacent base station.

Referring to FIG. 2, the user of the terminal 22 is located within the coverage area of base station 17 and has registered his URA with the associated ATS 13. His URA contains data peculiar to his circumstances. For instance, this data contains his preferential requirements, namely he is a vegetarian and is mobility-impaired. Thus, when accessing local information from the ATS 13 regarding restaurants and hotels, for example, the information sent back from the ATS 13 via the base station 17 will be filtered to include those restaurants with vegetarian menus and those hotels permitting wheel-chair access.

As the user moves from location to location, it is preferable for this personalised data to be forwarded to the next host platform e.g. ATS 14 associated with the geographical area he has moved into. In this way, he will automatically be provided with new local information services, similarly filtered.

A first protocol for enabling the URA to move from one host platform to another (e.g. from ATS 13 to ATS 14) takes the form of being "centralised" in that it requires access to a centralised tracking system. This protocol can be thought of as a "one-stop" protocol as it requires access to such a tracking mechanism if the terminal leaves a cell before its URA can catch up with it.

This first protocol is implemented by the following steps. With reference to FIG. 3, the terminal moves from cell A served by the base station 17 to cell B served by the base station 18 (step 24). The ATS 13 in cell A is notified that the terminal 22 has handed over to ATS 14 in cell B and is now taken charge of by this new host platform (step 25). If there is no URA resident on platform A then nothing happens but if there is, a pointer toward platform B (i.e. ATS 14) is tagged onto the URA (step 26).

FIG. 4 illustrates the steps implemented in moving the URA from platform A to platform B. The URA data needs to be moved if the terminal it is associated with is not taken in charge by the current platform (steps 27, 28, 29). If there is no pointer for this data (step 30), a location request is sent to a centralised tracking mechanism (step 31) which responds by sending back a pointer toward the platform that is currently in charge of the terminal (step 32). If this pointer points towards a working platform (step 33) then the pointer is tagged to the URA and the URA data is sent (step 34). Otherwise, the URA data is kept until the terminal is in an area linked to a working platform. If the sending operation fails, the protocol goes back to the previous point.

The centralised tracking mechanism (not shown) may comprise one of any appropriate known systems for locating the serving cell of a mobile terminal. For instance, such a mechanism could be linked to the telecommunications system's home location registers and visitor location registers as are provided for in the GSM system.

The new URA data may be transmitted from one platform to the next by way of the hard-wire links over the network 23 shown in FIG. 2.

A second protocol for enabling the URA to move from one host platform to another is a "direct access" type of protocol which dispenses with the need for a centralised tracking mechanism under normal operating conditions. This protocol has the advantage of always keeping a link between the terminal and its URA data so that it can access it transparently at any time. In the case of platform failure, a request for terminal location can be sent to a centralised tracking mechanism as previously described. If the terminal in the area is linked to an inoperative platform, the data waits until the terminal is in an area covered by a working platform.

A platform uses three pieces of information to maintain the link between a terminal and its URA data. These are pointers toward a platform called the terminal pointer, a pointer toward a platform called the data pointer and a number to deal with cycles in the terminal path.

In FIG. 5, platform A is notified that the terminal has been handed over and is now taken in charge by platform B (step 35). At platform A, the data pointer and the terminal pointer is set toward platform B (step 36). Platform B is notified that the terminal has been handed from platform A and is now taken in charge (step 37). At platform B, the terminal pointer is set to a "here" value (step 38). If there is no data pointer set, the data pointer is set toward platform A (step 39) and the number is set to 0. If a data pointer is set, the number is increased by 1 and platform B sends a "remove" order for the considered terminal to platform A (step 40).

When a platform receives a "remove" order for a terminal (step 41), if the number for this terminal is greater than 0 then it is decreased by 1 (step 42). Otherwise, this platform sends a "remove" order for this terminal to the platform pointed by the data pointer and deletes the terminal and data pointers and the number (step 43).

FIG. 6 illustrates the steps implemented in moving the URA data from platform A to platform B using this second "direct access" protocol. The URA data needs to be moved if the terminal it is associated with is not taken in charge by the current platform. If the terminal pointer points toward a working platform, the data is moved (step 44) otherwise, the data waits until the terminal is in an area linked to a working platform. The terminal pointer is then set to this platform (step 45) and the data is sent. If the sending is successful, the data pointer is set to the same platform as the terminal pointer (step 46). Otherwise, the protocol goes back to the previous point.

When URA data arrives, the platform sends a delete order and its address S for the considered terminal to platform pointed by the data pointer and the platform sets its data pointer to a "here" value (step 47).

When a platform receives a delete order and address S for a terminal and if the data pointer is set but not toward the platform which has address S, the order is forwarded to the platform pointed by the data pointer (step 48). Subsequently, the data and terminal pointers are deleted as is the number (step 49).

FIG. 7 shows how the terminal handover mechanism deals with loops for the direct access protocol. FIG. 7 shows a critical example where the data has not been able to follow the mobile terminal for some reason and also shows how the protocol deals with this in order to keep the link between the URA data and the terminal alive without keeping unused pointers. In step 50, the link between the mobile terminal and the data goes through several platforms. One difficulty with such links occurs when the mobile terminal goes back to a previously visited platform, thus creating a loop in the link (step 51). The protocol deals with such a loop by having the platform in charge of the terminal send a "remove" order along the path of the loop. The assigned member represents the number of loops that start at this platform for a given terminal. Receiving a remove order means that one loop has been deleted, therefore decreasing the number by 1. If the number is already 0, this means that this platform is part of an unused loop and so it removes its pointers and forwards the order so that is follows the entire loop.

Removing loops is not the only issue. Maintaining the link between the mobile terminal and the platform is also important. Even when loops are created, the link from the terminal to the URA data is always correct. I.e. once the data pointer is set, it does not change until it is removed (steps 51 to 54). This link always avoids loops, i.e. a data pointer link such as that illustrated in step 52, which only goes through two platforms. The URA data to terminal link is more chaotic in the sense that it is modified each time the terminal moves. However, this ensures that the link is always correct.

We claim:

1. A radio telecommunications system for facilitating access of information services by mobile subscriber terminals, the system comprising:
   a plurality of base stations serving a respective geographical area and for establishing a radio communications link with the subscriber terminal;
   a plurality of information host platforms one of each thereof being associated with a respective base station in which each information host platform incorporates information services local to said respective geographical area; and
   respective mobile user representative Agents (URA) associated with said subscriber terminals for transferring data between said information services and the associated subscriber terminal, said user representative Agents being responsive to movement of the associated subscriber terminal from communication linkage with a first base station to communication linkage with a second base station to move from a first information host platform associated with said first base station to a second information host platform associated with said second base station.

2. A radio telecommunications system as claimed in claim 1 wherein said user representative Agent is initially resident in the associated subscriber terminal and is adapted to execute user-defined functions on data concerning said information services.

3. A radio telecommunications system as claimed in claim 1 in which said user representative Agent comprises data enabling its registration with the information host platform to which it has moved and enabling the information host platform to ascertain whether the associated subscriber terminal is in communication linkage therewith.

4. A radio telecommunications system as claimed in claim 1 wherein said user representative Agent (URA) comprises data peculiar to a user of said subscriber terminal.

5. A radio telecommunications system as claimed in claim 1 in which each information host platform hosts at least one Agent (SRA) which is representative of local information services.

6. A radio telecommunications system as claimed in claim 1 in which each information host platform is adapted to tag a pointer onto an Agent registered therewith in order to assist onward transmission of the Agent to another information host platform.

7. A radio telecommunications system as claimed in claim 1 in which the plurality of information host platforms are linked together by a network enabling transmission of Agent data between said information host platforms.

8. A radio telecommunications system as claimed in claim 1 and including a link for linking the information host platforms to a remote global information service platform for providing global information services to said subscriber terminal.

9. A radio telecommunications system as claimed in claim 1 including a link for linking the plurality of base stations to a remote global information service platform for providing global information services to said subscriber terminal.

10. A radio telecommunications system as claimed in claim 2 and incorporating Agent means for accessing information services by said at least one subscriber unit.

11. A method of moving an Agent from a first information host platform to a second information host platform, the method including the steps of;
    receiving notification at the first information host platform that the Agent is to be moved to the second information host platform;
    at the first information host platform, attaching a pointer toward the second information host platform to the Agent, and
    sending the Agent from the first information host platform to the second information host platform.

12. A method of moving an Agent between information host platforms in the radio telecommunications system, the method including the steps of;
    sending from a first information host platform, a subscriber terminal location request to a remote tracking system;
    receiving a location pointer designating a destination information host platform from the remote tracking system and attaching the pointer to the Agent registered with the first information host platform; and
    sending the Agent from the first information host platform to the destination information host platform designated by the location pointer.

13. A method of moving an Agent from a first information host platform to a second information host platform in the radio telecommunications system, the method including the steps of;
    receiving at the first and second information host platforms notification that the Agent is to be moved from the first information host platform to the second information host platform;
    attaching at the first information host platform a data pointer to the Agent, setting a terminal pointer;
    sending the Agent from the first information host platform to the second information host platform designated by the terminal and data pointers;

at the second information host platform: setting a terminal pointer;
setting a cycle number for the second information host platform;
sending a remove order to the first host information platform;
and at the first information host platform;
receiving the remove order and either re-setting a cycle number, associated with the first information host platform if the cycle number for the first information host platform is greater than zero or, if equal to zero, deleting the terminal pointer, the data pointer and the cycle number associated with the first information host platform.

14. A method of moving an Agent from a first information host platform to a second information host platform in a radio telecommunications system for facilitating access of information services by a subscriber terminal, the system including a plurality of base stations serving a respective geographical area and establishing a radio communications link with the subscriber terminal, and a plurality of information host platforms one of each thereof being associated with a respective base station in which each information host platform incorporates information services local to said respective geographical area, the method including the steps of:

receiving at the first and second information host platforms notification that the Agent is to be moved from the first information host platform to the second information host platform;
attaching at the first information host platform a data pointer to the Agent, setting a terminal pointer;
sending the Agent from the first information host platform to the second information host platform designated by the terminal and data pointers;
at the second information host platform:
setting a terminal pointer;
setting a cycle number for the second information host platform;
sending a remove order to the first host information platform;
at the first information host platform:
receiving the remove order and either re-setting a cycle number, associated with the first information host platform if the cycle number for the first information host platform is greater than zero or, if equal to zero, deleting the terminal pointer, the data pointer and the cycle number associated with the first information host platform.

* * * * *